United States Patent
Lissotschenko et al.

(10) Patent No.: US 6,212,011 B1
(45) Date of Patent: Apr. 3, 2001

(54) OPTICAL BEAM-SHAPING SYSTEM

(76) Inventors: Vitaly Lissotschenko, Solbergweg 54, Dortmund (DE), D-44225; Joachim Hentze, Haus Lohe 1, Werl (DE), D-59457

( * ) Notice: Subject to any disclaimer, the term of this patent is extended or adjusted under 35 U.S.C. 154(b) by 0 days.

(21) Appl. No.: 09/254,234
(22) PCT Filed: Sep. 4, 1997
(86) PCT No.: PCT/EP97/04805
    § 371 Date: Mar. 2, 1999
    § 102(e) Date: Mar. 2, 1999
(87) PCT Pub. No.: WO98/10314
    PCT Pub. Date: Mar. 12, 1998

(30) Foreign Application Priority Data

Sep. 5, 1996 (DE) .............................. 196 35 942

(51) Int. Cl.$^7$ ............................................ G02B 27/10
(52) U.S. Cl. ................. 359/623; 359/622; 359/621; 359/619
(58) Field of Search .................... 359/619, 621, 359/622, 623, 626, 741, 742

(56) References Cited

U.S. PATENT DOCUMENTS

| | | | |
|---|---|---|---|
| 4,012,115 | * | 3/1977 | Brown ................................ 359/459 |
| 4,078,854 | | 3/1978 | Yano .................................. 359/458 |
| 4,431,266 | * | 2/1984 | Mori et al. ........................ 359/456 |
| 4,859,043 | * | 8/1989 | Carel et al. ....................... 359/742 |

FOREIGN PATENT DOCUMENTS

| | | |
|---|---|---|
| 41 41 937 | 6/1993 | (DE) . |
| 0 598 546 | 5/1994 | (DE) . |
| 0232037 | 8/1987 | (EP) . |
| 2154756 | 8/1985 | (GB) . |

* cited by examiner

Primary Examiner—Ricky Mack
(74) Attorney, Agent, or Firm—Collard & Roe, PC.

(57) ABSTRACT

An optical beam shaping system has optical elements arranged in a radiation bundle in part designed as lens arrays each having each several lenses for sensing partial radial bundles, their lens surface (3) being shaped into an optically active interface (2, 2') of a monolithic optical element (1). In order to provide a beam shaping system which can more effectively influence the beam parameters than the known prior art beam shaping systems and which has a more simple design, the interface (2, 2') has a curved basic shape.

24 Claims, 2 Drawing Sheets

OPTICAL BEAM-SHAPING SYSTEM

BACKGROUND OF THE INVENTION

1. Field of the Invention

The invention relates to an optical beam-shaping system with optical elements arranged in a radiation bundle, said elements having lens arrays each having a plurality of lenses each sensing partial radial bundles, whereby the surfaces of said lenses are shaped into an optically active interface of a monolithic refractive element.

2. The Prior Art

Optical beam-shaping systems generally are arrangements of optical elements by which a bundle of rays of light irradiated upon such elements is modified in a defined way with respect to its beam parameters. It is required in the main cases of practical application that a bundle of rays has a defined geometric shape and size with respect to its cross section, for example a circular, rectangular or lattice-like shape or the like, and/or an intensity distribution defined across its cross section. Both properties frequently have to be influenced simultaneously, for example if the light source delivering the incoming bundle of rays for the beam-shaping system supplies a bundle of rays with irregular intensity distribution and irregular geometric dimensions, but defined specifications have to be satisfied for the outgoing bundle of rays of the beam-shaping system with respect to its properties.

According to the state of the art, optical beam-shaping systems are known from EO 0 232 037 A2 in which a bundle of light rays can be irradiated into the system with irregular energy distribution, whereby their outgoing bundle of rays has a uniform intensity distribution over its cross section. Such beam-shaping systems are referred to also as homogenizers.

In addition to conventional optical elements such as, for example collecting lenses with positively curved, i.e. convex boundary surfaces, which detect the total cross section of the admitted bundle of rays, said homogenizer also has so-called lens arrays, which are composed of lenses which each only sense a part of the cross section of the beam, i.e., partial radial bundles.

A design has successfully gained acceptance in connection with optical homogenizers where cylinder lens arrays that are crossed relative to each other are arranged in the path of the rays. Said arrays are partly still assembled from individual cylinder lens elements; however, simple plane cylinder lens arrays are already available as well, which are ground from a monolithic block of glass or plastic.

However, with such monolithic optical elements as known according to the prior art, it has been possible heretofore to exclusively realize only homogenizers which additionally require the use of additional optical elements such as lenses or the like. However, in order to obtain not only an intensity distribution that has been made uniform over the cross section as with the homogenizer, but to also shape a defined intensity profile in a defined geometric from starting out from incoming bundles of rays of any shape, it is necessary according to the state of the art to first homogenize the incoming beam in order to then interconnect additional beam-shaping systems in the further course of the beam. It is known, for example, to preset an intensity profile by employing absorption filters or masks. A geometric shaping of the beam is accomplished by inserting correspondingly shaped masks in the path of the beam.

The drawback of the aforementioned geometric and intensity beam-shaping systems is obvious: the by far predominating part of the admitted radiation energy is absorbed in filters or in the impermeable regions of the masks and consequently no longer available as light energy in the outgoing bundle of rays. In the practical application of beam-shaping systems according to the state of the art, more than 90% of the energy irradiated into the system is lost in this way. The overall efficiency of such systems is consequently poor.

Furthermore, the known optical beam-shaping systems including the aforementioned homogenizers are assembled in each case from a multitude of structural optical elements, with the result that their manufacture and adjustment are complicated and costly.

SUMMARY OF THE INVENTION

Starting out from the relevant state of the art the object of the invention is to solve the aforementioned problems and in particular to make available an optical beam-shaping system which, combined with the possibility of influencing the beam parameters, has superior efficiency and a simpler structure.

For achieving this object the invention provides that the interface has a curved basic shape.

The invention starts out from the finding that the plane lens arrays employed in the beam-shaping systems known heretofore, and the other optical components, for example imaging lenses and the like, can be integrated in one single or in just a few monolithic optical elements. Said monolithic refractive elements as defined by the invention are characterized in that the optically active interfaces, for example the surfaces of a lens on the inlet and outlet sides form a curved basic shape, the surface of which is quasi modulated, i.e., superposed with the smaller lens surfaces of the individual lenses of a lens array.

In addition to the obvious advantage that it is possible in this way to drastically reduce the number of structural elements employed, for example by combining all structural elements used heretofore in a homogenizer in one single monolithic element, there arises a further advantage which now becomes available only through such monolithic integration, to begin with: due to the shaping and alignment of the lens array in any desired way, taking into account the curved basic shape, it is possible for the first time to preset through such shaping almost any desired influencing of the beam parameters with respect to geometry and intensity distribution, i.e., to quasi program such influencing in the monolithic element. Since no absorbing structural elements such as filters or masks are employed for this purpose, high degrees of efficiency are achieved as compared to the prior art. As a rule, the absorption losses will be negligibly low in this connection.

The realization of the desired properties, which includes targeted influencing of all beam parameters, does required in the individual case a certain expenditure in terms of calculations for determining the interface geometry. However, such expenditure is of no great negative consequence in view of the available computer capacity. On the contrary, it is minor in light of the further advantage that the monolithic optical elements as defined by the invention require no further adjustments after their manufacture and, furthermore, cannot gel out of adjustment in the course of time.

The invention basically makes it possible to combine the separate structural elements required heretofore for an optical beam-shaping system in one single optical element, in each case in an advantageous way. It may be useful and advantageous for said purpose depending on the individual case if the basic shape of a surface disposed in the path of light, i.e., the interface of the monolithic optical elements is concave or convex, and provided with a spherical, aspherical or also cylindrical shape. The lens surfaces of the lenses of a lens array shaped into the surface of said basic shape themselves again may be concave or convex, and spherical, aspherical or also cylindrical.

The interface, i.e., the basic shape may be both rotation-symmetric or elliptic, or it may have any other conceivable geometric form. This applies to the individual lenses of a lens array as well. For example, strip-like lenses can be shaped into a quadrangular basic surface, or facet-like lenses may be arranged rotation-symmetrically on a rotation-symmetric—e.g. circular—or elliptic basic shape.

According to preferred further developments of the invention, provision is made that the individual lenses of a lens array have different focal lengths and/or different apertures. The intensity in the focus can be modulated by the measures in such a way that it is possible, for example to preset Gaussian profiles, or any other desired distributions.

Owing to the combination possibilities resulting therefrom, which, when the system is designed, practically offer almost complete freedom with respect to focal lengths, apertures, interface shapes and arrangements of the optical axes, the shaping of a beam, i.e., influencing of the beam parameters in view of geometry and intensity, can be integrated in nearly any desired manner in the optical element as defined by the invention, i.e., it can be programmed.

Depending on the requirements in the individual case, i.e., change in the beam parameters between the bundle of rays admitted into the beam-shaping system and the bundle of rays exiting from such system, the invention offers the possibility of designing only one interface of the optical element as defined by the invention in the way as defined by the invention, i.e., either the surface which the bundle of rays enters or the one from which it exits. For example, it may be advantageous to divide one single monolithic element, where lens arrays are shaped into both interfaces, in two monolithic elements which are movable against each other, which permits a certain variability of the optical properties of the overall beam-shaping system.

Furthermore, it may be useful if a lens array is designed as a lens matrix, i.e., as a two-dimensional array with a multitude of lens surfaces arranged in the form of a grid, or also in the form of a one-dimensional array, for example an array in which a multitude of cylinder lens surfaces are arranged linearly next to each other. Said lens surfaces may have different apertures, i.e., widths, and also focal lengths deviating from each other.

According to a preferred embodiment of the beam-shaping system as defined by the invention, provision is made that cylinder lens arrays are shaped into the two interfaces of the monolithic element, with the cylinder lenses of said arrays being arranged crossed relative to one another. A homogenizer as structured in the state of the art from a multitude of cylinder lens arrays and imaging lenses can be realized in this way in one single optical structural element. Such a design not only excludes any later maladjustment; the losses unavoidably occurring on the interfaces are reduced as well due to the fact that several interfaces are eliminated, which results in an increase of the overall efficiency.

In the aforementioned homogenizer, the cylinder lens arrays may have convex cylinder lenses, which are usually employed in the state of the art. However, special advantages are obtained because the cylinder lens arrays have concave cylinder lenses, or convex lenses basically have the drawback of having a real focal point where the energy density may increase under certain circumstances to such an extent that either losses may occur due to ionization or damages may be caused in the optical material. Concave cylinder lenses, on the other hand, only have a virtual focal point, so that losses caused by the aforementioned effects can basically not occur.

It is basically possible to employ all available optical materials for practically realizing the monolithic element as defined by the invention, for example high-quality plastics or glasses suitable for this purpose. The manufacturing processes employed for the production must then be coordinated with the material used. The transformation of the free-form surface geometry required for the integration of the different optical surfaces is usefully carried out by computer-assisted manufacturing methods.

BRIEF DESCRIPTION OF THE DRAWINGS

Exemplified embodiments of beam-shaping systems as defined by the invention are explained in greater detail in the following with the help of the drawings, in which the following is shown in detail.

DETAILED DESCRIPTION OF PREFERRED EMBODIMENTS

Figure 1:
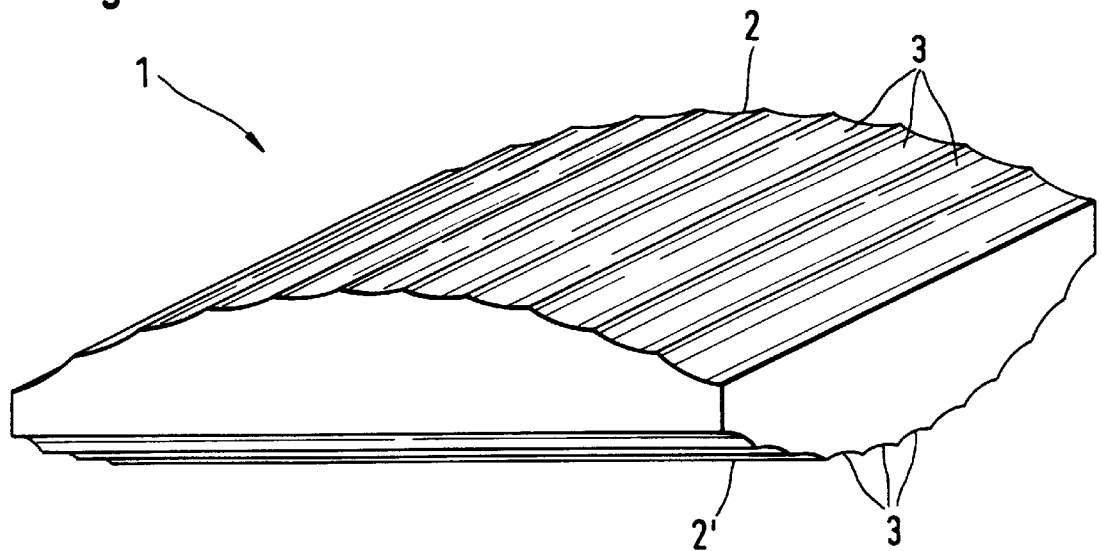
FIG. 1 shows a first embodiment of a monolithic optical element as defined by the invention.

FIG. 1 is a perspective view of a monolithic optical element as defined by the invention, which as a whole is denoted by reference numeral 1. In the view shown, interface 2 disposed at the top is the light inlet surface, and interface 2' disposed at the bottom is the light outlet surface, or vice versa.

Both interfaces 2, 2' have a convex-cylindrical basic shape, with the cylinders being arranged in a crossed way.

A one-dimensional array of concave cylinder lenses 3 is shaped into both the upper interface 2 and the lower interface 2'. The longitudinal axes of the cylinders of cylinder lenses 3 each are disposed parallel with the cylinder longitudinal axes of the interfaces 2 and 2'.

In the embodiment shown, the monolithic optical element 1 already forms a homogenizer with defined optical properties. By shaping the cylinder lenses 3 and the interfaces 2, 2', the beam parameters are already influenced in a defined way in the course of the manufacture.

It is particularly advantageous with this embodiment that the cylinder lenses are concave and thus have no real focal point in the interior of the monolithic optical element 1. High energy densities that could lead to damage of the optical material are avoided in this way.

Figure 2:
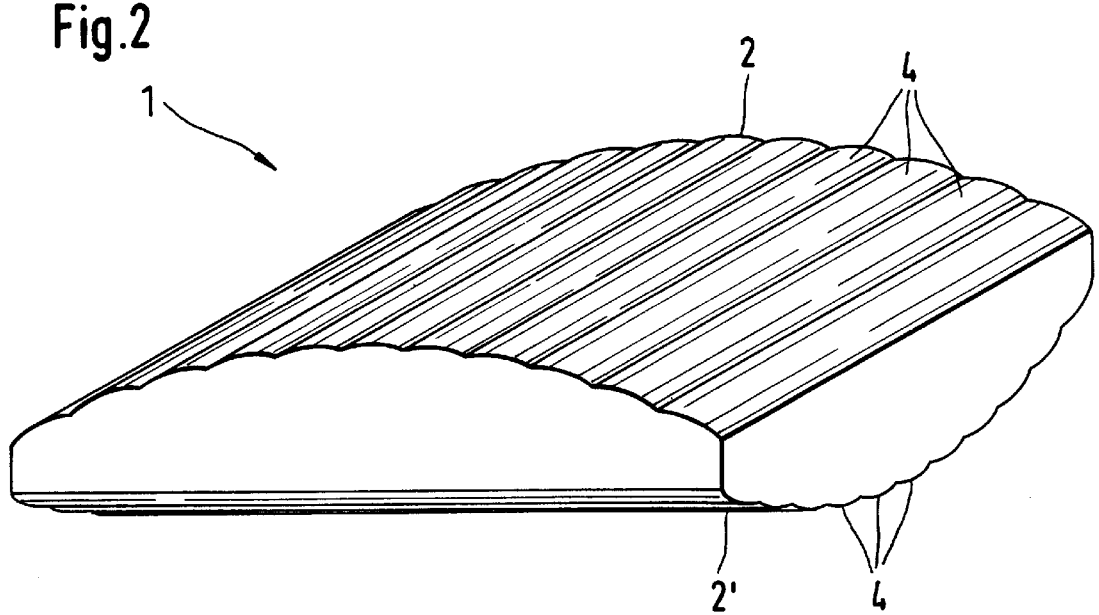
FIG. 2 shows a second embodiment of a monolithic optical element as defined by the invention.

FIG. 2 shows in the same representation as in FIG. 1 a similarly structured monolithic optical element, which is denoted by reference numeral 1 as well. The only difference as compared to FIG. 1 is that the cylinder lenses 4 shaped into its interfaces 2, 2' are designed in a convex-cylindrical form.

The advantages of the homogenizers shown in FIGS. 1 and 2 lie in that they have only two optically active interfaces and consequently a particularly high degree of efficiency. Furthermore, as compared to homogenizers structured from a plurality of optical elements they are constructed in an overall simpler way, and they, furthermore, do not require any adjustment.

Figure 3:
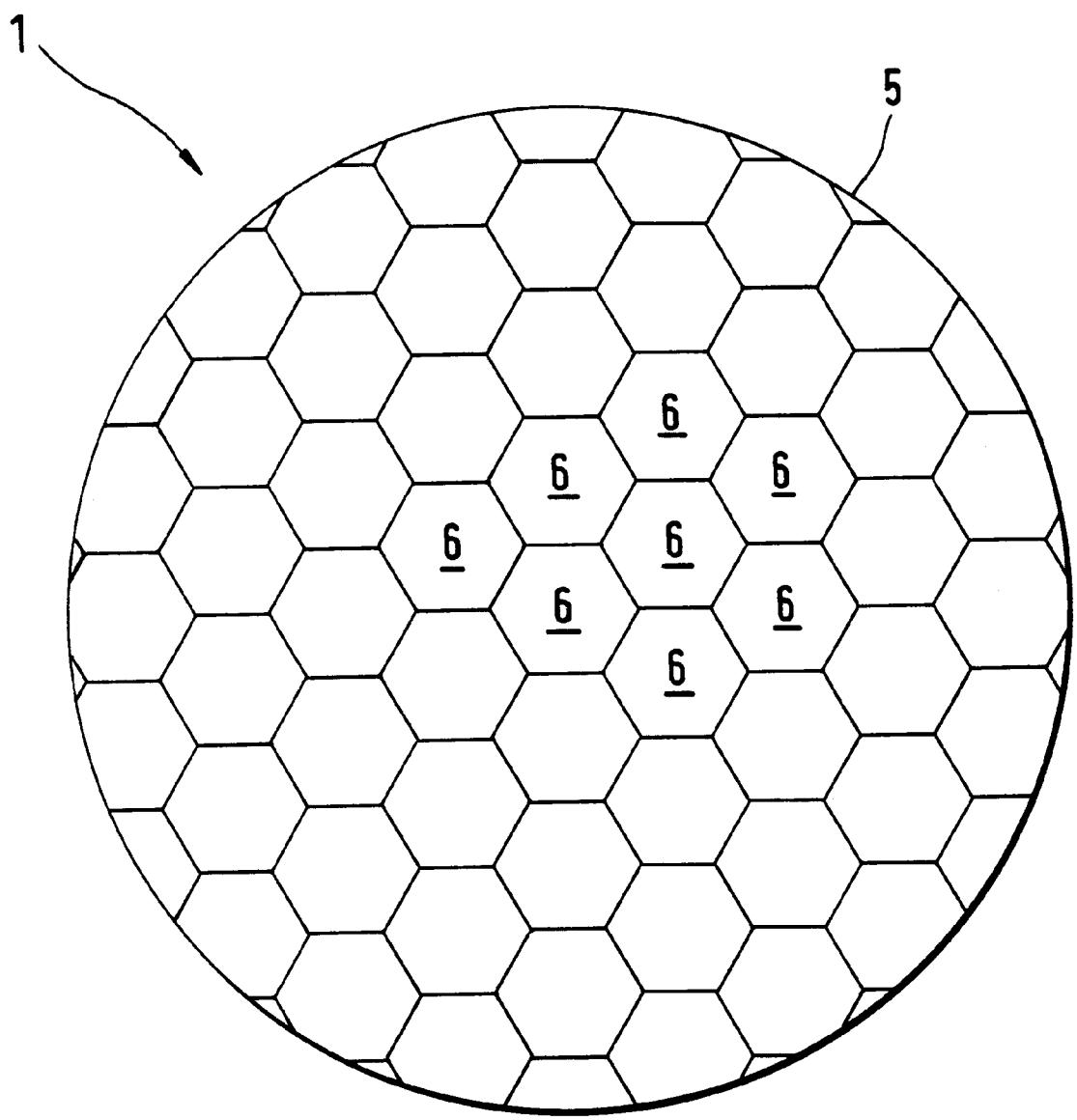
FIG. 3 shows a third embodiment of a monolithic optical element as defined by the invention.

FIG. 3 shows an axial view of an optically active interface 5 of another embodiment of a refractive element 1 as defined by the invention. The special feature in this case is that the basic shape, i.e., interface 5 is designed circular. Facet-like individual lenses 6 are rotation-symmetrically shaped into the round basic surface which, according to the invention, has a basic shape normally curved relative to the plane of the drawing, i.e., for example a spherical-convex basic shape. According to the invention, said lenses again may be designed in a spherical, aspherical or cylindrical, convex or concave form, and may have different focal lengths and/or apertures. In the same way, interface 5 may be elliptic as well.

It is possible through computer-assisted manufacture to produce with relatively low expenditure monolithic optical elements 1 for influencing the beam parameters in practically any desired way.

What is claimed is:

1. An optical beam-shaping system with optical elements arranged in a radiation bundle, said elements having only two lens arrays;

each lens array comprising a plurality of lenses each sensing a partial radial bundle, whereby their lens surfaces are shaped into an optically active interface of a monolithic refractive element, wherein the interface (2, 2', 5) has a curved basic shape;

wherein lens arrays are arranged on each of two interfaces (2, 2', 5) of the monolithic element (1) disposed one after the other in the radiation path; and wherein cylinder lens arrays are shaped into the two interfaces (2, 2', 5) of the monolithic element (1), the cylinder lenses of said arrays being arranged crossed relative to one another.

2. The beam-shaping system according to claim 1, wherein the basic shape is concave.

3. The beam-shaping system according to claim 1, wherein the basic shape is convex.

4. The beam-shaping system according to claim 1, wherein the basic shape is spherical.

5. The beam-shaping system according to claim 1, wherein the basic shape is aspherical.

6. The beam-shaping system according to claim 1, wherein the basic shape is cylindrical.

7. The beam-shaping system according to claim 1, wherein the basic shape is rotation-symmetrical.

8. The beam-shaping system according to claim 1, wherein the basic shape is elliptic.

9. The beam-shaping system according to claim 1, wherein the lens surfaces of the lenses (3, 4, 6) of a lens array are concave.

10. The beam-shaping system according to claim 1, wherein the lens surfaces of the lenses (3, 4, 6) of a lens array are convex.

11. The beam-shaping system according to claim 1, wherein the lens surfaces of the lenses (3, 4, 6) of a lens array are spherical.

12. The beam-shaping system according to claim 1, wherein the lens surfaces of the lenses (3, 4, 6) of a lens array are aspherical.

13. The beam shaping system according to claim 1, wherein the lens surfaces of the lenses (3, 4, 6) of a lens array are cylindrical.

14. The beam-shaping system according to claim 1, wherein the lenses (3, 4, 6) of a lens array are rotation-symmetrical.

15. The beam-shaping system accordingly to claim 1, wherein the lenses (3, 4, 6) of a lens array are elliptic.

16. The beam-shaping system according to claim 1, wherein the lenses (3, 4, 6) of a lens array have different focal lengths.

17. The beam-shaping system according to claim 1, wherein the lenses (3, 4, 6) of a lens array have different apertures.

18. The beam-shaping system according to claim 1, wherein the lenses (3, 4, 6) of a lens array have differently aligned optical axes.

19. The beam-shaping system according to claim 1, wherein one lens array is a one-dimensional array.

20. The beam-shaping system according to claim 1, wherein one lens array is a two-dimensional array.

21. The beam-shaping system according to claim 1, wherein one lens array is arranged on an interface (2, 2', 5) of the monolithic element (1) disposed in the radiation path.

22. The beam-shaping system according to claim 1, wherein the cylinder lens arrays have concave cylinder lenses.

23. The beam-shaping system according to claim 1, wherein the cylinder lens arrays have convex cylinder lenses.

24. The beam-shaping system according to claim 1, wherein the two interfaces (2, 2') of the monolithic element are cylindrical-convex, whereby the cylinder surfaces are arranged crossed.

* * * * *